United States Patent
Le Brazidec et al.

(10) Patent No.: US 8,145,990 B2
(45) Date of Patent: *Mar. 27, 2012

(54) SYSTEMS AND METHODS TO DYNAMICALLY RECOGNIZE A DATABASE MEMBER IDENTIFIER ENTERED INTO A SPREADSHEET CELL

(75) Inventors: Pierre Jean Le Brazidec, Guichen (FR); Florent Migeon, Clichy (FR)

(73) Assignee: SAP France, Levallois-Perret (FR)

( * ) Notice: Subject to any disclaimer, the term of this patent is extended or adjusted under 35 U.S.C. 154(b) by 951 days.

This patent is subject to a terminal disclaimer.

(21) Appl. No.: 12/142,388

(22) Filed: Jun. 19, 2008

(65) Prior Publication Data
US 2009/0319553 A1 Dec. 24, 2009

(51) Int. Cl.
*G06F 17/27* (2006.01)
(52) U.S. Cl. ......... 715/220; 715/212; 715/214; 715/219
(58) Field of Classification Search ................ 715/212, 715/214, 219, 220
See application file for complete search history.

(56) References Cited

U.S. PATENT DOCUMENTS

| 6,553,364 | B1 * | 4/2003 | Wu ........................................ 1/1 |
| 6,766,325 | B1 * | 7/2004 | Pasumansky et al. ................. 1/1 |
| 6,931,418 | B1 * | 8/2005 | Barnes .......................... 707/776 |
| 7,139,766 | B2 | 11/2006 | Thomson et al. |
| 2006/0271841 | A1 | 11/2006 | Thanu et al. |
| 2006/0294086 | A1 * | 12/2006 | Rose et al. ........................ 707/3 |

FOREIGN PATENT DOCUMENTS
EP 1394696 A2 * 3/2004
* cited by examiner

*Primary Examiner* — Doug Hutton, Jr.
*Assistant Examiner* — Andrew Dyer
(74) *Attorney, Agent, or Firm* — Buckley, Maschoff & Talwalkar LLC

(57) ABSTRACT

According to some embodiments, a system, method, means, and/or computer program code are provided to facilitate use of a spreadsheet application to access information stored in a multi-dimensional data source. Some embodiments include receiving, at an analyzer module, a change indication from the spreadsheet application, the change indication being associated with an identifier entered by a user into a spreadsheet cell. In response to the change indication, a member associated with the identifier in a multi-dimensional data source may be dynamically determined. Information in the spreadsheet may then be replaced with a formula based at least in part on the determined member.

24 Claims, 9 Drawing Sheets

700

| C4 | Fx | =AnalyzerOLAPMember("[Entity by ATBASE0].[ATBASE0].&[1]","","S1100 - FOOD","","-524285.59.1","[Entity by ATBASE0]","","") |

| | A | B | C | D | E | F |
|---|---|---|---|---|---|---|
| 1 | | | | | | |
| 2 | | | | | | |
| 3 | | | | 2004 | | |
| 4 | | | S1100 – FOOD | 1592323 | | |
| 5 | | | | | | |
| 6 | | | | | | |
| 7 | | | | | | |
| 8 | | | | | | |
| 9 | | | | | | |

710

| C4 | Fx | =AnalyzerOLAPMember("[Entity by ATBASE0].[ATBASE0].&[1]","S1100 - FOOD",,-524285.59.1",[Entity by ATBASE0]",,) |
|---|---|---|

| | A | B | C | D | E | F |
|---|---|---|---|---|---|---|
| 1 | | | | | | |
| 2 | | | | | | |
| 3 | | | | 2004 | | |
| 4 | | | S1100 – FOOD | 1592323 | | |
| 5 | | | | | | |
| 6 | | | | | | |
| 7 | | | | | | |
| 8 | | | | | | |
| 9 | | | | | | |

FIG. 7

SYSTEMS AND METHODS TO DYNAMICALLY RECOGNIZE A DATABASE MEMBER IDENTIFIER ENTERED INTO A SPREADSHEET CELL

FIELD

Some embodiments of the present invention relate to business information, business intelligence, and/or enterprise systems. In particular, some embodiments relate to systems and methods to dynamically recognize a database member identifier entered into a spreadsheet cell in accordance information from one or more business information, business intelligence, and/or enterprise system databases.

BACKGROUND

A business information, business intelligence, and/or enterprise system can improve an organization's ability to monitor and manage data in a complex business environment. For example, the systems offered by Business Objects SA of Levallois-Perret, France and SAP AG of Walldorf, Germany, provide components and tools that allow users to monitor, retrieve, view and manipulate business information, including business warehouse data stored and maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like.

In some cases, a user needs to retrieve some of the stored business information according to various intents: explore the information, create a display or report that shows the information and the like. The user may, for example, import a particular set of information into a spreadsheet application by entering a name or identifier into various cells in a spreadsheet to define what information should be associated with those cells, rows, and/or columns. For example, the user may associate a particular row with a measure such as profit and a number of columns with different fiscal years, where the years are associated with a dimension. Measures and dimensions may be defined, for example, in a metadata model associated with the stored business information.

To associate a particular cell, row, and/or column with particular types of business information, a user may enter an identifier into a spreadsheet cell. For example, a user might type product names into a number of different cells in order to create a report showing how profitable each product was in a given year. The user might then select a function that "validates" the report and inserts the appropriate profit information into cells of the spreadsheet. At this point, any errors in the product names entered by the user may be brought to his or attention. Such an approach, however, can be inefficient, especially when enters a relatively large number of product names (e.g., when the report is validated, he or she might realize that a similar mistake was made with respect to many different product names).

It would be desirable to provide improved methods and systems that facilitate an access of business information by a user, including situations where the user a relatively large amount data is available to the user.

BRIEF DESCRIPTION OF THE DRAWINGS

FIGS. 6 and 7 are exemplary embodiments illustrating the present invention.

DETAILED DESCRIPTION

To alleviate problems inherent in the prior art, some embodiments of the present invention introduce systems, methods, computer program code and/or means to dynamically recognize a database member identifier entered into a spreadsheet cell in accordance information from one or more business information, business intelligence, and/or enterprise system databases. Some embodiments are described herein as accessing Online Analytic Programming (OLAP) information associated with a multi-dimensional data schema. Note, however, that embodiments may be associated with other types of information including data described by a metadata model (e.g., which may itself include metadata structures) associated with the data. Such data can include information stored in one or more data sources, such as relational databases.

Figure 1:
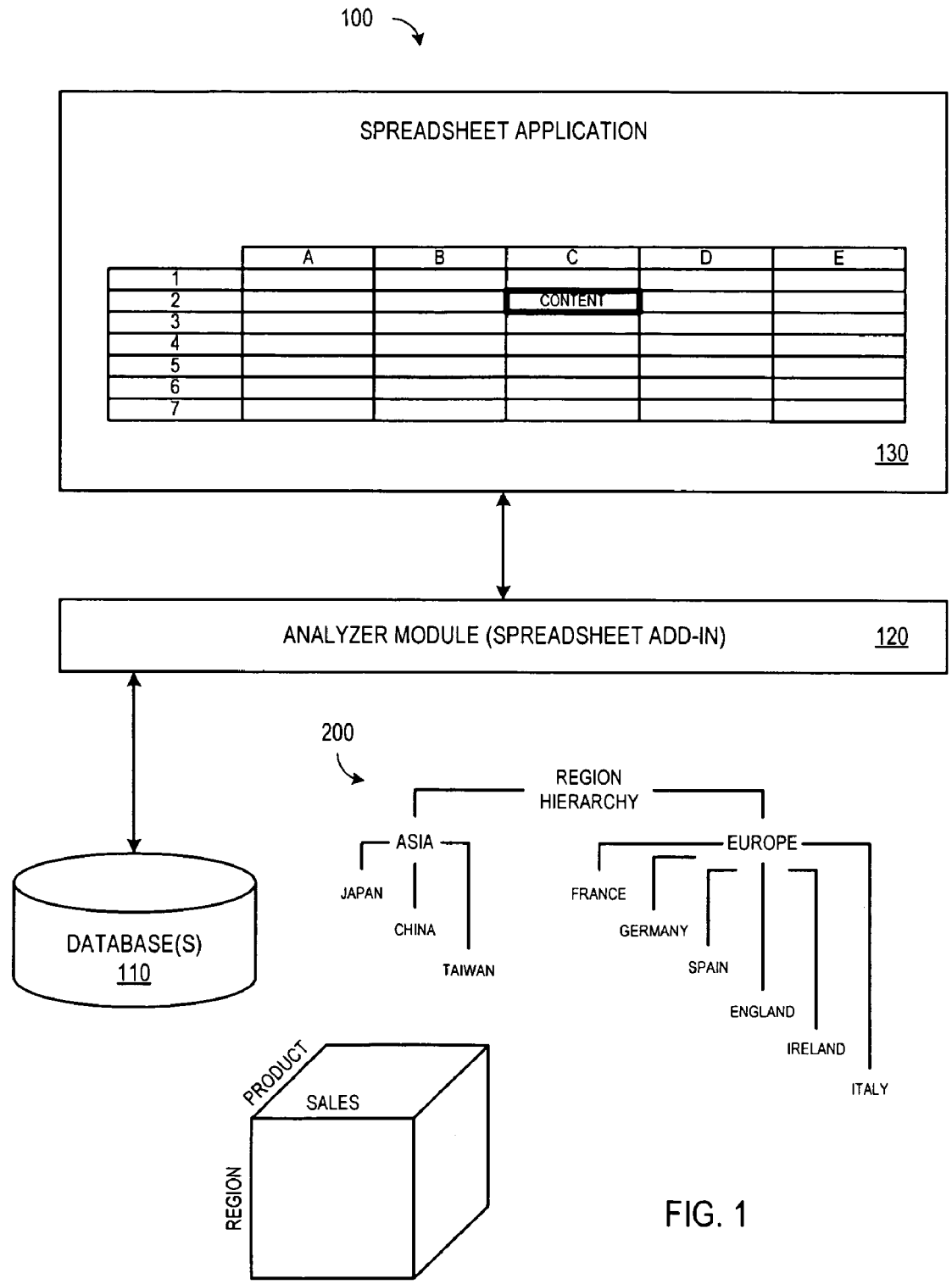
FIG. 1 is a diagram of a system according to some embodiments of the present invention.
Figure 2:
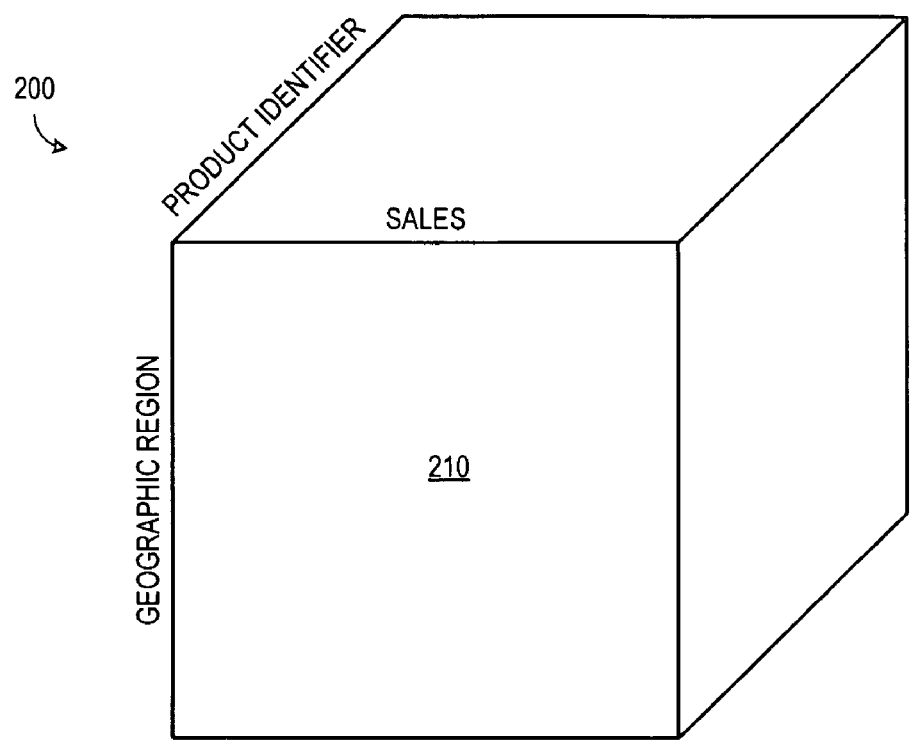
FIG. 2 illustrates how information is stored and/or accessed in accordance with some embodiments of the present invention.
Figure 2:
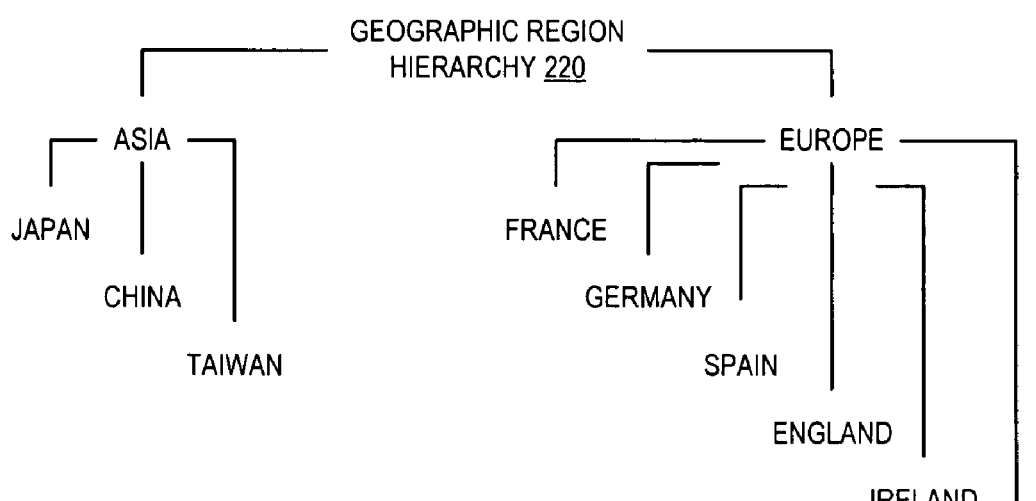

FIG. 1 is a diagram of a system 100 according to some embodiments of the present invention. The system 100 includes one or more databases 110 that may store information, such as business information. For example, FIG. 2 illustrates information 200 that might be stored and/or accessed in accordance with some embodiments of the present invention. In particular, the information 200 includes an OLAP cube 210. An OLAP cube 210 or hypercube may comprise, for example, a data structure storing financial information as numeric facts (or "measures") categorized by dimensions. The OLAP cube 210 may include or be associated with a metadata model that describes aspects of the cube, such as, the measures, the dimensions, the relationships or hierarchy of the dimensions, and the like. Although an OLAP cube 210 is illustrated in FIG. 2, note that embodiments may be associated with other types of data sources, such as a multi-dimensional data source. The OLAP cube 210 illustrated in FIG. 2 stores measures associated with sales, product identifier, and geographic region dimensions. Note that the OLAP cube 210 may store information in accordance with any number of dimensions. In some embodiments, the stored information 200 may be accessed using Multi-Dimensional Expressions (MDX) which is a declarative query and data manipulation language similar to Structured Query Language ("SQL") but adapted for multi-dimensional data.

The stored information 200 may include and/or be described by a metadata model. The metadata model may, for example, include relationships between data elements, common and multilingual names for the elements, descriptions of elements, data lineage for data elements, and the like. The stored information 200 may, in some cases, be arranged in a hierarchy structure 220 providing a series of parent-child relationships (e.g., where a parent member represents a consolidation of children members). A hierarchy usually has more than one level and may or may not be symmetrical. Symmetry for hierarchies includes balance (where all branches end at the same level), leveling (where all members on a certain level are derived from a single source), and the like.

For example, the hierarchy structure 220 illustrated in FIG. 2 organizes the geographic region dimension in a first level as representing either "Asia" or "Europe." Moreover, the "Europe" region is further organized at a lower level as including the following sibling regions: "France," "Germany," "Spain," "England," "Ireland," and "Italy."

Referring again to FIG. 1, an analyzer module 120 may act as an interface between the databases 110 and a spreadsheet application 130. The spreadsheet application 130 might be associated with, for example, the Microsoft® Excel® and IBM® Lotus 1-2-3® spreadsheet programs. The analyzer module 120 might comprise, for example, a spreadsheet add-in such as the BusinessObjects Extended Analytics Analyzer Excel Add-In from Business Objects SA. As used herein, a spreadsheet "add-in" may refer to, for example, a plug-in component or module that executes in association with a spreadsheet application to provide additional functionality for a user. Note that that the analyzer module 120 and the spreadsheet application 130 might execute at a first device (e.g., a user PC or workstation) while the databases 110 are stored at a second device, remote from the first device. According to some embodiments, some or all of the information in the databases 110 may be co-located with the device executing the analyzer module 120 and spreadsheet application 130. According to still other embodiments, some or all of the spreadsheet application 130 executes via a web based interface.

Figure 3:
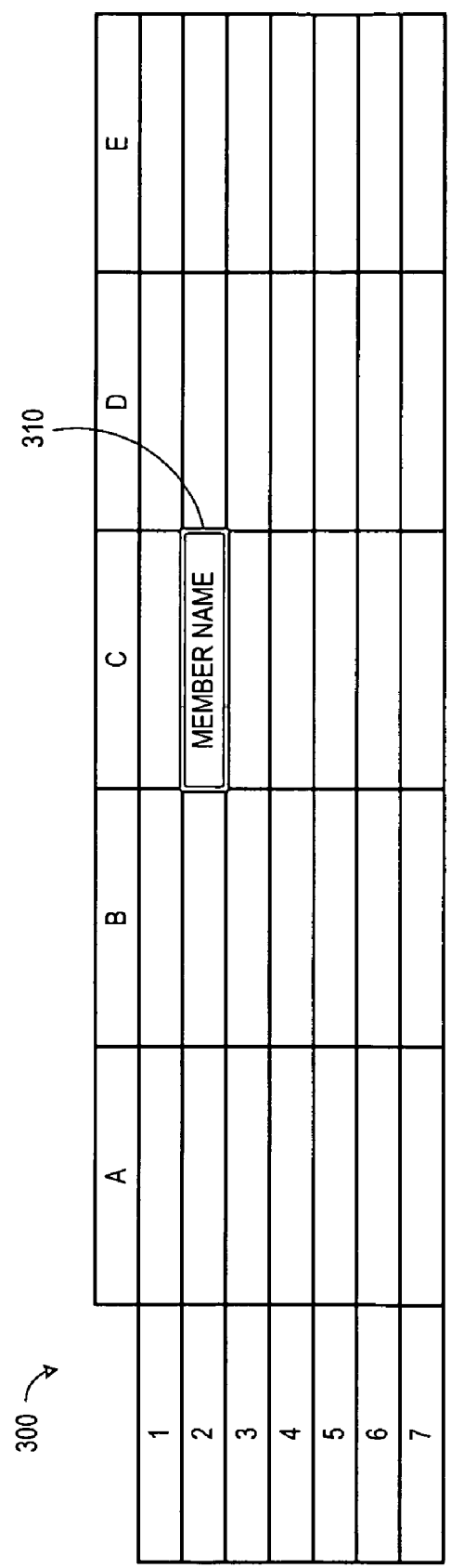
FIG. 3 illustrates a spreadsheet user display according to some embodiments of the present invention.

According to some embodiments, a user may define and view a spreadsheet, using the spreadsheet application 130, in order to have free form access to the information in the databases 110. For example, FIG. 3 illustrates a spreadsheet user display 300 that includes cell rows (rows 1 through 7) and columns (columns A through E). Note that the display 300 illustrated in FIG. 3 may only represent a small portion of an actual spreadsheet. For example, a spreadsheet might include thousands of rows and/or columns.

A user may select one or more of the spreadsheet cells to represent a currently active cell 310. For example, a user might position a cursor over a cell and perform an action (e.g., a mouse click) to designate that cell as the currently active cell 310.

Each cell in the spreadsheet user display 300 may contain content, such as a numeric value, text, an image, or a formula. By way of example, the active cell 310 of FIG. 3 (cell C2) might contain the formula "=A2+B2." In this case, the spreadsheet application 130 may automatically compute the appropriate value (based on the current content stored in cells A2 and B2) to be displayed in the active cell 310. According to some embodiments, the spreadsheet user display 300 may further include graphical representations (e.g., charts) representing the content of the various cells.

The spreadsheet user display 300 may help a user access and understand the information stored in, for example, the OLAP cube 210. For example, a user may enter information in a cell to associate that cell, row, and/or column with a particular dimension of data in the OLAP cube 210. A user may, for example, create a report such that the cells in rows 3 through 6 of column B define four regions (France, Germany, Spain, and England) while the cells in columns C and D of row 2 define sales years (2009 and 2010). The analyzer module 120 may retrieve information from the OLAP cube 210 and insert the proper numerical values in the spreadsheet (e.g., an indication that German sales in 2010 were "450,011" could be displayed in cell D4 of the spreadsheet).

The analyzer module 120 may comprise a registered automation add-in of the spreadsheet application 130 that receives notifications from the spreadsheet application 130 in the form of "events." For example, the spreadsheet application 130 might issue an event to the analyzer module 120 whenever a cell or set of cells is changed by the user.

The analyzer module 120 may also store and/or recognize information in cells using pre-determined types of formulas. For example, the analyzer module 120 might store and/or recognize the following type of formula in spreadsheet cells:

=AnalyzerOLAPMember(fullName,displayName)

where displayName is a string representing what should be shown on the user's display and fullName defines where the information is actually stored in the OLAP cube 210. The full name may correspond to an element in the metadata model associated with the OLAP cube 210. By way of example only, a particular cell might contain the formula:

=AnalyzerOLAPMember("[Region].[Europe].
    [France]","France")

Note that such a formula might include other parameters, such as a unique identifier associated with the data (e.g., a unique alphanumeric string that might be used to correlate information even when a display name and/or full name has been changed), dimension information, hierarchy information, and/or metadata.

To associate a particular cell, row, and/or column with particular data in the OLAP cube 210, a user may enter an identifier into the cell via the spreadsheet application. For example, a user might enter fullNames and/or displayNames into a number of different cells in order to create a report of information that he or she desires. The user might then select a function that "validates" the report and inserts the appropriate formulas into cells of the spreadsheet. At this point, any errors in the identifiers entered by the user may be brought to his or attention. For example, if the user entered "Francx" into one of the cells, he or she might be asked to re-enter identifier. Such an approach, however, can be inefficient, especially when enters a relatively large number of identifiers (e.g., when the report is validated, he or she might realize that similar mistakes were made when typing a large number of different identifiers).

Figure 4:
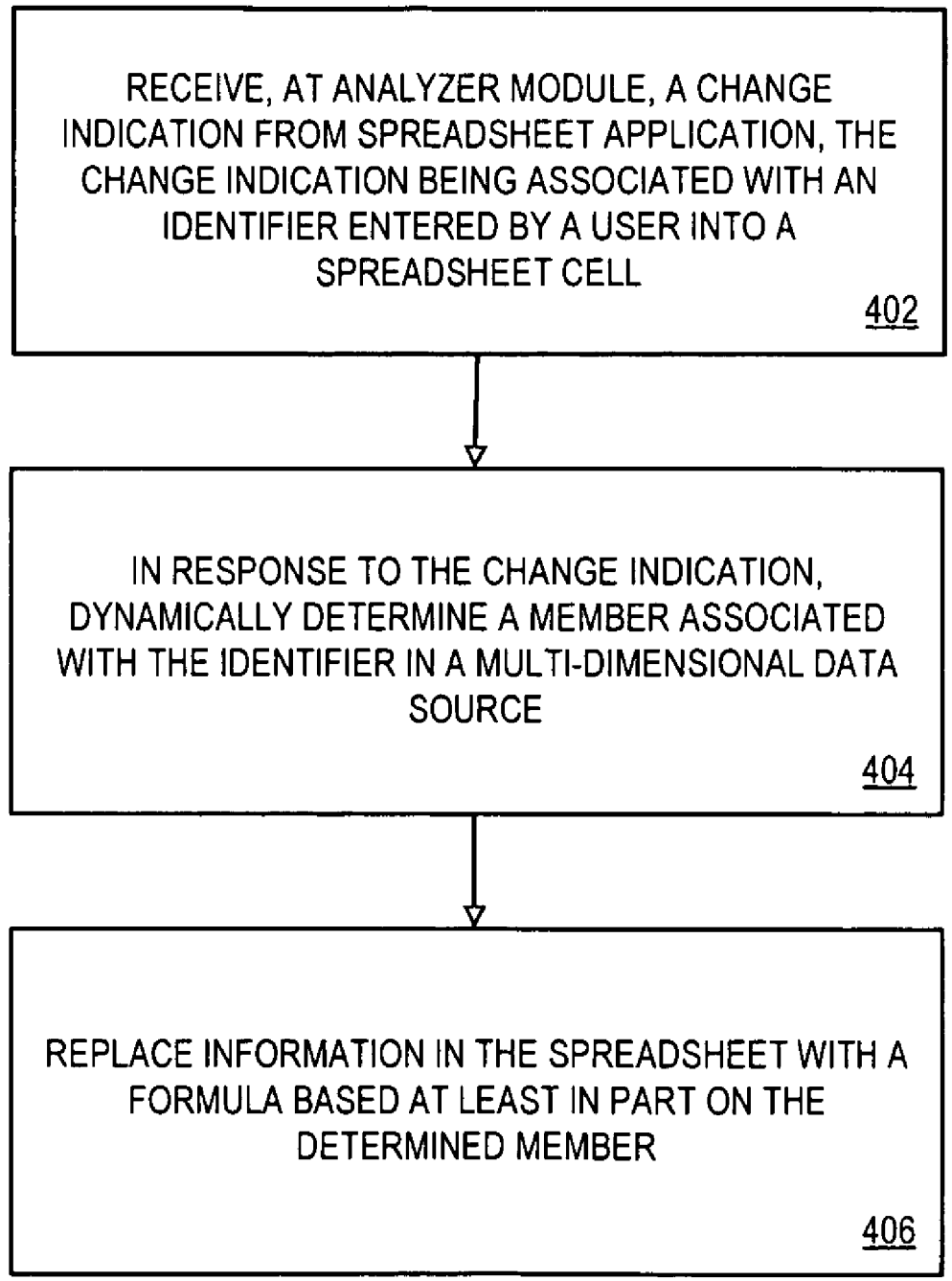
FIG. 4 is a flow diagram of a method according to some embodiments.

According to some embodiments, events from the spreadsheet application 130 generated "on the fly" (e.g., as the user enters information and before a report is validated) may be advantageously used by the analyzer module 120 to facilitate an access of business information stored in the databases 110. For example, FIG. 4 is a flow diagram depicting process steps that may be performed by the business information enterprise system 100 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 402, a change indication may be received at an analyzer module. For example, the analyzer module might receive an indication of a change event from a spreadsheet application when a user enters an identifier (e.g., a text string) into a cell.

In response to the change indication, a member associated with the identifier in the multi-dimensional data source may be dynamically determined at 404. For example, the analyzer module might compare the identifier entered by the user with a list of member names associated with a multi-dimensional data source. According to various embodiments, the analyzer module might determine that a user-entered identifier string matches a particular member name string when all of the characters in the two strings are identical or when a subset of the characters are the same. Note that the determination performed at 402 may be "dynamic," for example, because it is performed as a user enters information (instead of when an entire report is validated).

At 406, information in the spreadsheet may be replaced with a formula based at least in part on the determined member. For example, the analyzer module might automatically insert the AnalyzerOLAPMember formula (previously described), including the appropriate fullName and displayName parameters, into the currently active cell based on the name string entered by the user. Note that this may be performed dynamically (e.g., immediately after the user enters information into a cell and prior to a report validation). According to some embodiments, an indication may be provided to the user to confirm that the dynamic determination and replacement were successfully performed (e.g., the active cell might briefly flash on the display). According to another embodiment, an indication is provided to the user when the dynamic determination and replacement were not successfully performed (e.g., a sound might indicate that no match was found).

Figure 5:
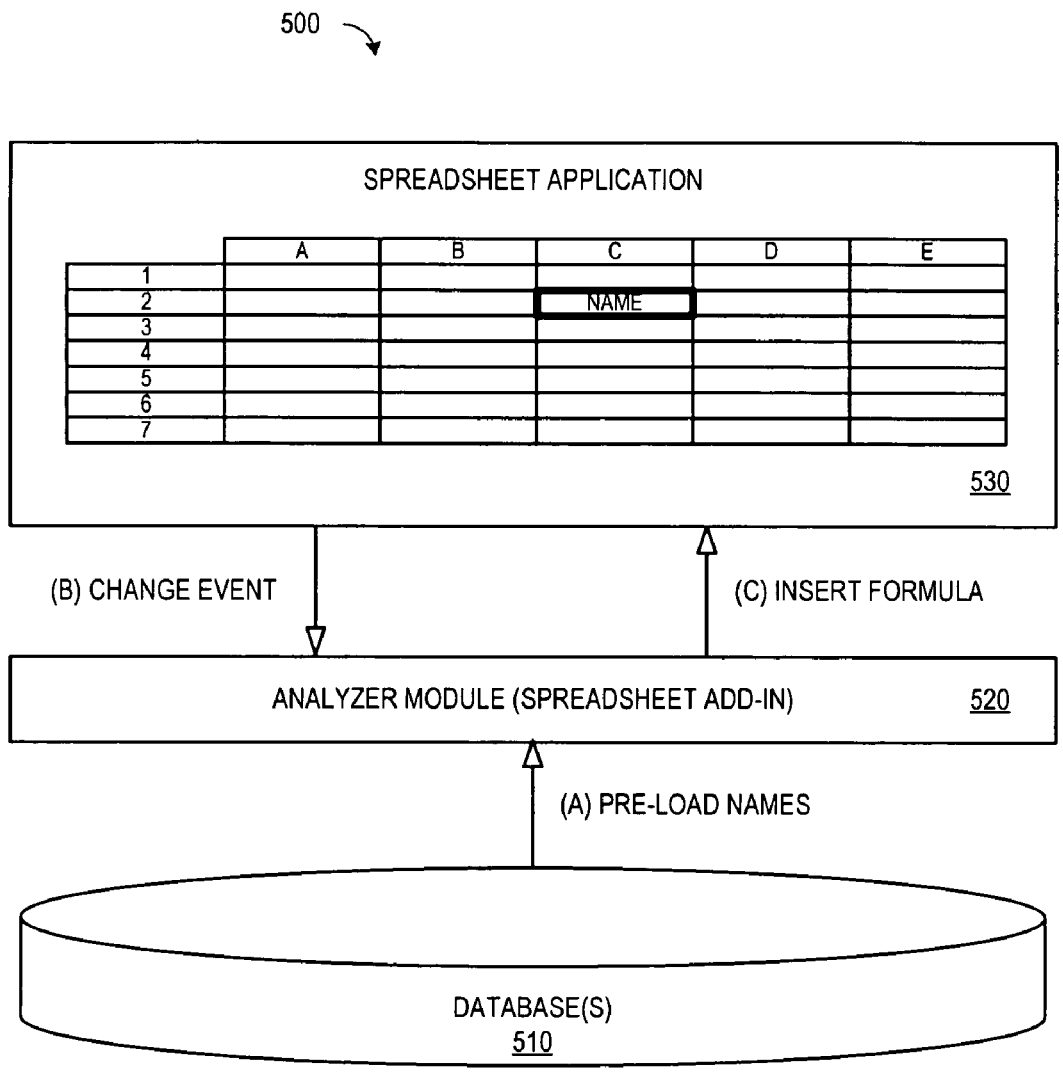
FIG. 5 is an information flow diagram according to some embodiments of the present invention.

FIG. 5 is an information flow diagram 500 according to some embodiments of the present invention. The diagram 500 may be associated with, for example, steps that facilitate a display of information stored in one or more external databases 510 (e.g., one or more multi-dimensional data sources). The external databases 510 may, for example, store information about members such that at least some members are siblings of other members. According to some embodiments, the external databases 510 further store a metadata structure defining a hierarchy for the members. As used herein the "external" databases 510 may include one or more databases remote from a device executing a spreadsheet application 530 and an analyzer module 520 (e.g., an add-in or plug-in component of the spreadsheet application 530).

At action (A), the analyzer module 520 pre-loads information associated with a plurality of members of the databases 510. For example, the analyzer module 520 might pre-load a list of dimension and/or member name strings from the databases 510. According to some embodiments, the pre-loading is performed by issuing a query to the external databases 510 asking for information dimension and/or member names.

At action (B), the analyzer module 520 receives a change event from the spreadsheet application 530. In particular, the change event indicates that new content has been placed into a spreadsheet cell (e.g., a name string has been entered by a user).

The analyzer module 520 then compares the content with the pre-loaded information. For example, the analyzer module 520 might search a list of locally stored information, such as dimension and/or member name strings, in an attempt to match (or partially match) a name string entered by a user. When a match is found, the analyzer module 520 automatically creates a formula to be placed into a spreadsheet cell. At action (C), the analyzer module 520 loads the automatically created formula into the appropriate cell via the spreadsheet application 530.

Figure 6:
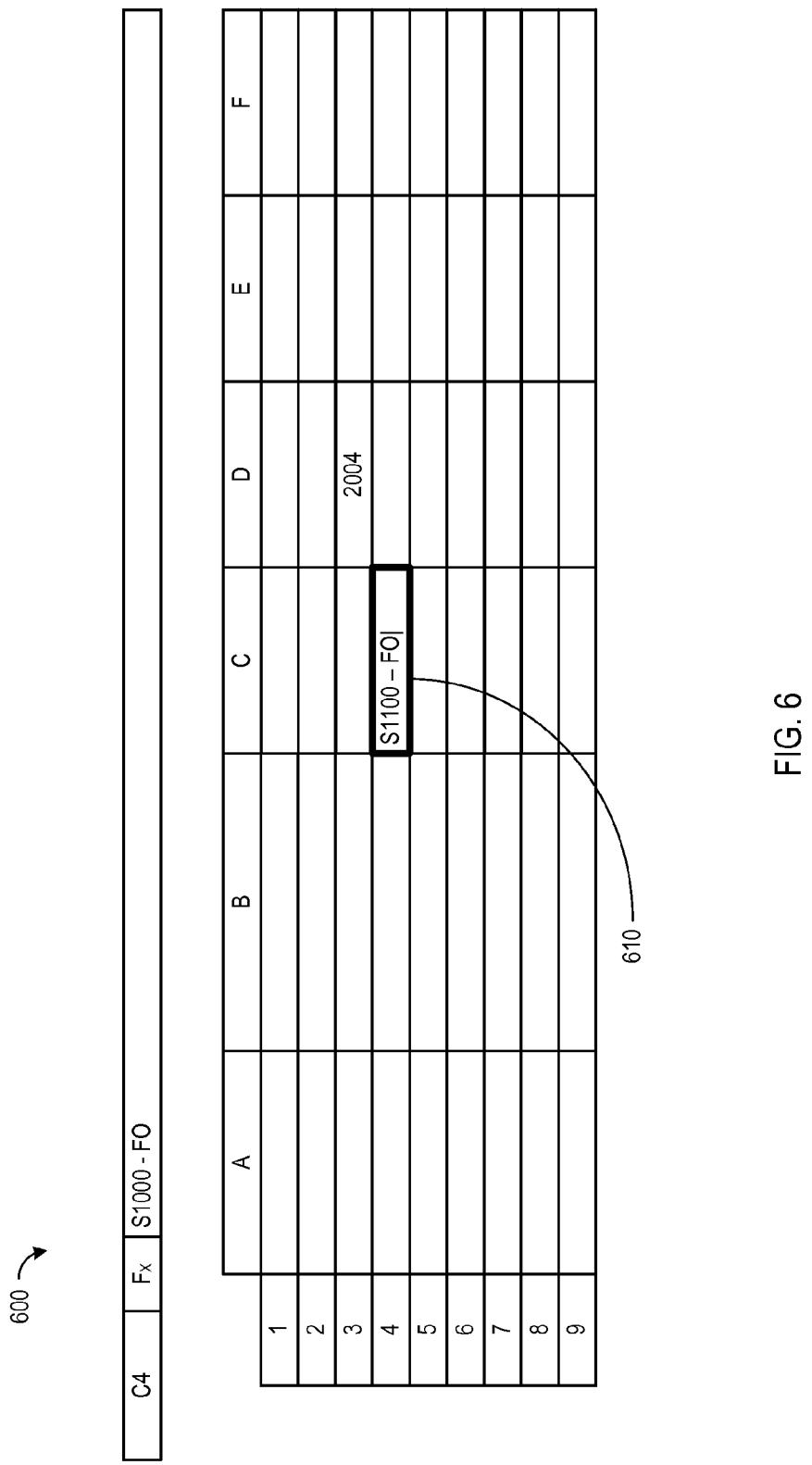

FIG. 6 illustrates an exemplary spreadsheet display 600 illustrating some embodiments of the present invention. In this case, the user has made cell C4 the active cell 610 and entered the name string "S1100-Fo" into the cell 610. The analyzer add-in receives an event from the spreadsheet application indicating that cell C4 now contains the content "S1100-Fo." In response to the event, the analyzer add-in searches a locally stored list of names (previously loaded from a multi-dimensional database) looking for a match. When a match is found, an appropriate AnalyzerOLAPMember formula is constructed and automatically inserted, as illustrated by the active cell 710 in spreadsheet display 700 illustrated in FIG. 7 (where the displayName "S1100-Food" was matched to the partial name string entered by the user). Moreover, the appropriate numeric value associated with that member of is also automatically retrieved and displayed in cell D4.

Figure 8:
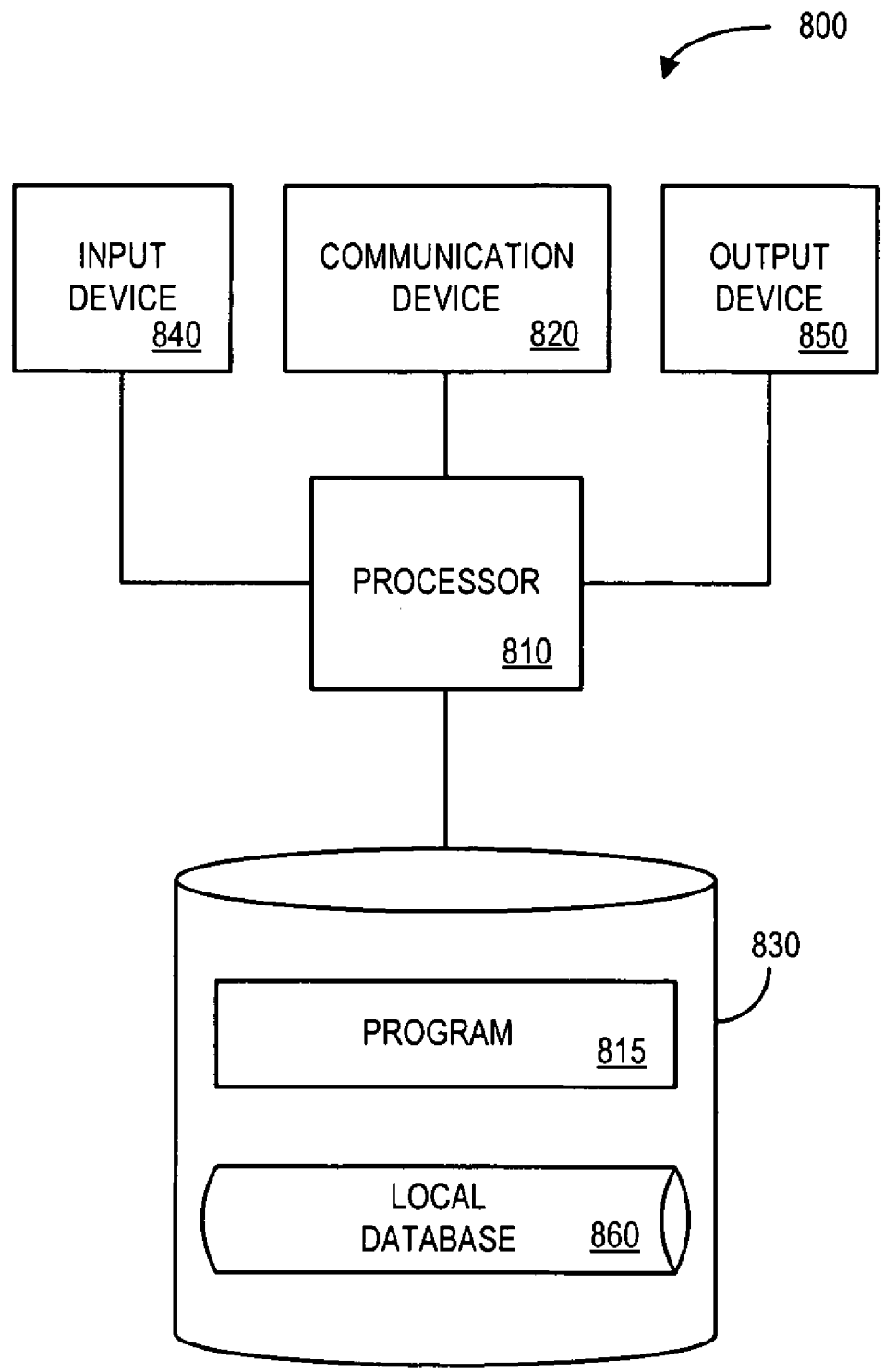
FIG. 8 is a block diagram of an apparatus in accordance with some embodiments of the present invention.

FIG. 8 is a block diagram of an apparatus 800 in accordance with some embodiments of the present invention. The apparatus 800 might, for example, execute a spreadsheet application and a spreadsheet plug-in or module similar to analyzer module 120 illustrated in FIG. 1. The apparatus 800 comprises a processor 810, such as one or more INTEL® Pentium® processors, coupled to a communication device 820 configured to communicate via a communication network (not shown in FIG. 8). The communication device 820 may be used to exchange OLAP or other business information, for example, with one or more multi-dimensional data sources (e.g., associated with remote databases or other devices).

The processor 810 is also in communication with an input device 840. The input device 840 may comprise, for example, a keyboard, a mouse, or computer media reader. Such an input device 840 may be used, for example, to select an active cell and/or to enter information into the active cell. The processor 810 is also in communication with an output device 850. The output device 850 may comprise, for example, a display screen or printer. Such an output device 850 may be used, for example, to provide reports and/or display business information.

The processor 810 is also in communication with a storage device 830. The storage device 830 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 830 stores a program 815 for controlling the processor 810. The processor 810 performs instructions of the program 815, and thereby operates in accordance any embodiments of the present invention described herein. For example, the processor 810 may access a database that stores information about a plurality of members arranged in a hierarchy such that at least some members are siblings of other members. The processor 810 might further execute a spreadsheet component for the manipulation of multiple rows and columns of cells that contain content, the spreadsheet component being adapted to (i) receive from a user content entered into a cell, and (ii) generate a change event in response to the content received from the user.

The processor 810 may further execute a spreadsheet add-in component adapted to: (i) receive the change event from the spreadsheet component, (ii) dynamically determine a member of the database in accordance with the content, and (iii) replace the content in the spreadsheet cell with a formula based at least in part on the determined member.

As used herein, information may be "received" by or "transmitted" to, for example: (i) the apparatus 800 from other devices; or (ii) a software application or module within the apparatus 800 from another software application, module, or any other source. As shown in FIG. 8, the storage device 830 may also store a local information database 860 according to some embodiments. The local information database 860 may, for example, store information about some or all of the metadata associated with a multi-dimensional data source, OLAP cube, data warehouse, or any other data source.

The illustration and accompanying descriptions of devices and databases presented herein are exemplary, and any number of other arrangements could be employed besides those suggested by the figures. For example, multiple databases associated with different types of business information might be associated with the apparatus 800. Similarly, the local information database 860 may store different types of additional information that may be helpful when matching user entered name strings with database members, such as spelling variations (including misspellings and country-specific spelling variations), aliases (e.g., nicknames), and/or language variations (e.g., translated names).

Thus, some embodiments of the present invention may dynamically match a user entered name string with an appropriate member of a multi-dimensional data source. If no match is found, the analyzer module might simply leave the name string in the cell (or ask a user to re-enter the information). In some cases, however, more than one potential match for a user entered name string may be found by the analyzer module. For example, if the user enters "United" into an active cell, the analyzer module might determine that "United States," "United Kingdom," and "United Arab Emirates" are all potential matches for that name string.

Figure 9:
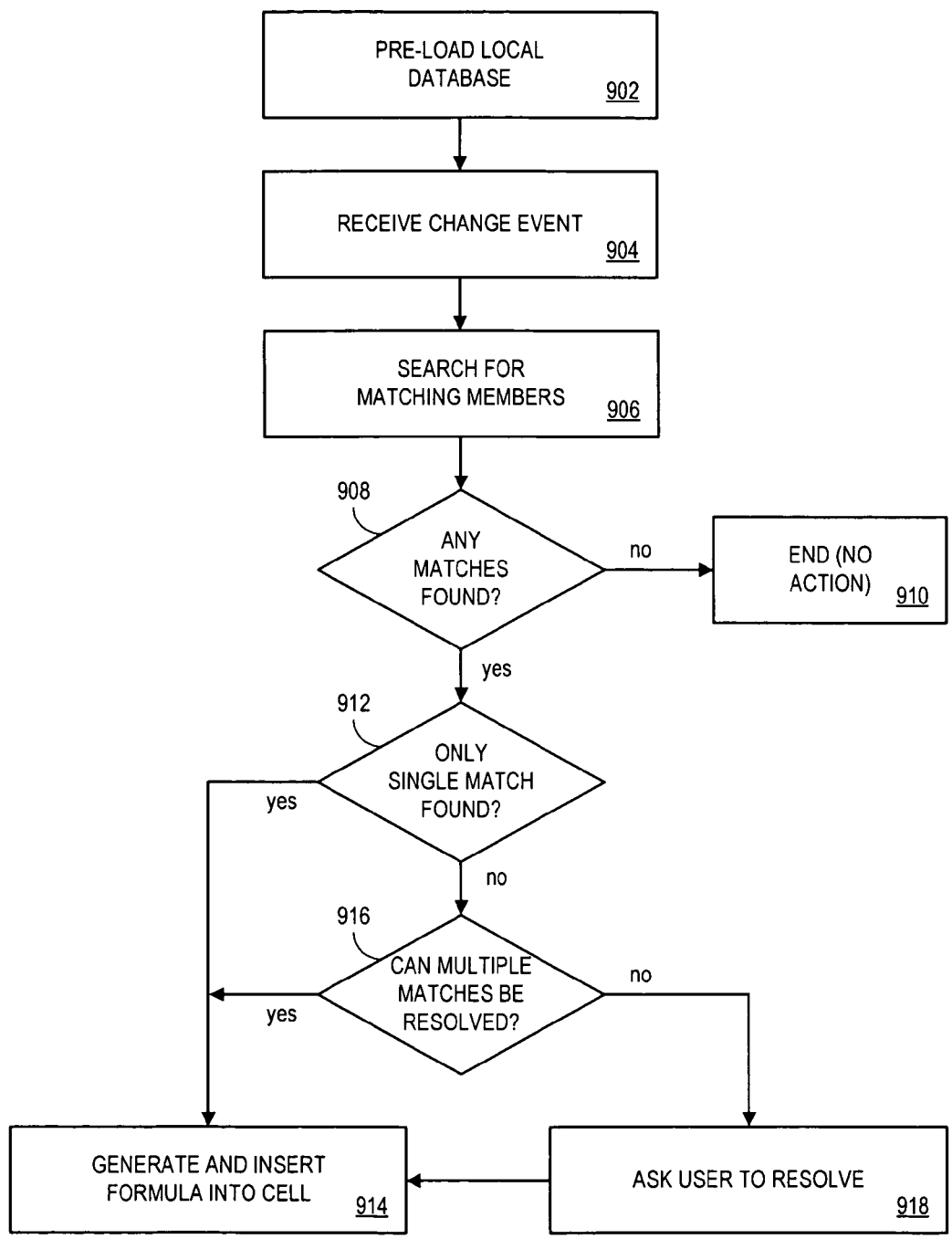
FIG. 9 is a flow diagram of a method according to some embodiments.

FIG. 9 is a flow diagram of a method according to some embodiments. At 902, a database local to an analyzer add-in is pre-loaded with metadata associated with a multi-dimensional data source. At 904, a change indication is received at the analyzer add-in from a spreadsheet application (e.g., an Excel OnSheetChange event might be received). The change indication may be associated with a name entered by a user into a spreadsheet cell. According to some embodiments, no further action is taken if an event indicates that multiple cells have been simultaneously changed.

In response to the change indication, a dynamic search is performed in an attempt to match the name with a member of the multi-dimensional database at 906. For example, the name string entered by a user may be parsed and compared to a map of names to nodes in a hierarchy. If no matches are found at 908, the process ends and no action is performed at 910. If a single match is found at 912 (that is, the match is unique), the name in the spreadsheet cell is replaced with content automatically generated by the analyzer add-in in accordance with the matched member at 914.

If more than one potential match is found at 912, the analyzer add-in may attempt to resolve which member is most likely being referenced by the user. For example, the analyzer add-in may determine the multiple members that potentially match the user entered identifier are defined in a single hierarchy or dimension of the multi-dimensional data source.

According to some embodiments, the analyzer add-in may then present to the user at 918 indications associated with at least some of the plurality of members. For example, a pop-up window listing the full names of the potential matches might be displayed to the user. The analyzer add-in may then receive from the user a selection of one of the indications. The selection from the user may then be used to resolve the multiple matches, and the name in the spreadsheet cell may be replaced with content automatically generated based on that selection at 914.

In some cases, the analyzer add-in may determine the multiple members that potentially match the user entered identifier are found in several different hierarchies and/or dimensions of the multi-dimensional data source. According to some embodiments, the analyzer add-in may attempt to select an appropriate hierarchy based on a context associated with the spreadsheet cell modified by the user. The context information might, for example, be based on a neighboring cell or the last cell entered by a user. According to some embodiments, the context information is based on another cell in the same row as and proximate to the active cell (or another cell in the same column as and proximate to the active cell). The context information may then be used to resolve the multiple matches at 916, and the name in the spreadsheet cell may be replaced with content automatically generated based on the context at 914. If the context information fails to resolve the ambiguity, a user might be asked to select an appropriate member as previously described with respect to 918.

As a result of embodiments described herein, a user may be able to create spreadsheet displays of business information more quickly as compared to prior approaches. Moreover, embodiments may help reduce errors associated with the definition of such reports and displays (e.g., because the user does not need to remember and enter the exact identifier of each and every member).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the applications and databases described herein may be combined or stored in separate systems). Similarly, although a particular information flow and user interactions have been given as examples, other and/or additional steps may be performed in accordance with any embodiments described herein. For example, although the dynamic matching of information may be helpful to a user, in some situations he or she may want to avoid using this feature (e.g., when entering information in a portion of a spreadsheet that is not related to a multi-dimensional database). As a result, a toolbar selection might be provided such that the dynamic determination and replacement of name strings can be deactivated by the user.

According to some embodiments, an analyzer module may parse the name string in accordance with at least one syntax rule. For example, a user might avoid ambiguity by typing information in addition to the member name (and thus avoid being asked which member or he or she is referring to).

According to some embodiments, a user might specify the name of a dimension and/or hierarchy, such as by entering "[DimensionName].MemberName" into a spreadsheet cell. Moreover, a syntax rule might look for a particular alphanumeric character (or combination of characters) in a name string entered by the user. In this case, the analyzer module might recognize that the characters between the brackets ("[ ]") refer to a specific dimension of the multi-dimensional data source.

Applicants have discovered that embodiments described herein may be particularly useful in connection with an access of information from a multi-dimensional data source via a spreadsheet application. Note, however, that other types of applications and databases, including transactional and relational databases, may also benefit from the invention.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions, to facilitate use of a spreadsheet application to access information stored in a multi-dimensional data source, that when executed by a processor result in the following:
   pre-loading, at an analyzer module, information associated with a plurality of member names of the multi-dimensional data source;
   after said pre-loading, receiving, at the analyzer module, a change indication from the spreadsheet application, the change indication being associated with a portion of a member name entered by a user into a spreadsheet cell, wherein the pre-loaded information is not displayed in any spreadsheet cell before the change indication is received;
   in response to the change indication, dynamically determining a member in the multi-dimensional data source having a name matching the portion of the member name entered by the user; and
   replacing information in the spreadsheet with a formula based at least in part on the determined member.

2. The medium of claim 1, wherein the multi-dimensional data source comprises an online analytic processing cube and associated metadata structure, and said pre-loading comprises:
   pre-loading information associated with a plurality of member names of the online analytic processing cube defined in the associated metadata structure.

3. The medium of claim 1, wherein the portion of the member name entered by the user comprises an alphanumeric name string.

4. The medium of claim 3, wherein the process steps further comprise:
   parsing the alphanumeric name string in accordance with at least one syntax rule.

5. The medium of claim 3, wherein the multi-dimensional data source is stored external to the analyzer module and determining is performed by matching a portion of the alphanumeric name string with information stored local to the analyzer module about member names of the multi-dimensional data source.

6. The medium of claim 1, wherein the member dynamically determined is a single member that matches the portion of the member name entered by the user and placing is performed automatically by the analyzer module.

7. The medium of claim 1, wherein a plurality of members match the portion of the member name entered by the user.

8. The medium of claim 7, wherein the process steps further comprise:
   determining that the plurality of members matching the portion of the member name entered by the user are defined in a single hierarchy of the multi-dimensional data source;
   presenting to the user indications associated with at least some of the plurality of members; and
   receiving from the user a selection of one of the indications, wherein dynamically determining the member associated with the portion of the member name entered by the user in the multi-dimensional data source is based on the received selection.

9. The medium of claim 7, wherein the process steps further comprise:
   determining that the plurality of members matching the portion of the member name entered by the user are defined in a plurality of hierarchies.

10. The medium of claim 9, wherein the process steps further comprise:
    selecting an appropriate hierarchy based on a context associated with the spreadsheet cell.

11. The medium of claim 10, wherein the context is associated with at least one of: (i) at least one other cell in the same row as and neighboring the spreadsheet cell, or (ii) at least one other cell in the same column as and neighboring the spreadsheet cell.

12. The medium of claim 9, wherein the process steps further comprise:
    presenting to the user indications associated with at least some of the plurality of members; and
    receiving from the user a selection of one of the indications, wherein dynamically determining the member associated with the portion of the member name entered by the user in the multi-dimensional data source is based on the received selection.

13. The medium of claim 1, wherein dynamically determining and replacing can be deactivated by the user.

14. The medium of claim 1, wherein the process steps further comprise:
    providing to the user an indication that said dynamic determination and replacement were performed.

15. The medium of claim 1, wherein the formula is associated with a set of parameters including at least one of: (i) a full name, (ii) a display name, (iii) a dimension name, or (iv) a hierarchy name.

16. The medium of claim 1, wherein the analyzer module comprises a registered automation add-in of the spreadsheet application.

17. A system, comprising:
    a database storing information about a plurality of members, including member names;
    a spreadsheet component, including a processor executing instructions to:
       receive from a user at least a portion of a name entered into a first cell, and
       generate a change event in response to the at least a portion of the name received from the user; and
    a spreadsheet add-in component, including the processor executing instructions to:
       pre-load information associated with a plurality of member names from the database,
       after the pre-load is performed, receive the change event from the spreadsheet component, wherein the pre-loaded information is not displayed in any spreadsheet cell before the change event is received, dynamically determine a member of the database have a name matching the at least a portion of the name received from the user; and replace content in a second spreadsheet cell with data from the database based on the determined member, wherein the second cell is different than the first cell.

18. The system of claim 17, wherein the database is associated with an online analytical processing cube.

19. A method to facilitate a display to a user of information associated with members stored in an external database, comprising:

pre-loading, at an analyzer add-in, information associated with a plurality of member names of the external database;

receiving, at the analyzer add-in, a change indication from a spreadsheet application, the change indication being associated with a first name entered by a user into a spreadsheet cell, wherein the pre-loaded information is not displayed in any spreadsheet cell before the change indication is received;

in response to the change indication, dynamically matching the first name with a second name of a member of an external database; and replacing the first name in the spreadsheet cell with content generated based on the matched member.

20. The method of claim 19, wherein the external database further stores a metadata structure defining a hierarchy for the members.

21. The method of claim 19, wherein the external database comprises a database remote from a device executing the spreadsheet application and the analyzer add-in.

22. The method of claim 21, said dynamic matching is performed based on information stored locally to the analyzer add-in.

23. The method of claim 22, wherein the locally stored information includes at least one of: (i) spelling variations, (ii) aliases, or (iii) language variations.

24. The method of claim 19, wherein the generated content is associated with a multi-dimensional expression query.

* * * * *